United States Patent
Carpenter et al.

(10) Patent No.: US 10,546,435 B2
(45) Date of Patent: Jan. 28, 2020

(54) SYSTEM AND METHOD OF DETERMINING REMAINING USEFUL LIFE OF AN AIR FILTER

(71) Applicant: Caterpillar Inc., Peoria, IL (US)

(72) Inventors: Richard Carpenter, Chillicothe, IL (US); Shawn Ryon, Metamora, IL (US); Phil Spengler, Washington, IL (US); Shaobin Liu, Houston, TX (US); Stephen Morey, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 211 days.

(21) Appl. No.: 15/850,772

(22) Filed: Dec. 21, 2017

(65) Prior Publication Data
US 2019/0197794 A1    Jun. 27, 2019

(51) Int. Cl.
| | | |
|---|---|---|
| *G01M 17/00* | (2006.01) | |
| *G07C 5/00* | (2006.01) | |
| *F02M 35/10* | (2006.01) | |
| *G06F 3/048* | (2013.01) | |
| *F02M 35/02* | (2006.01) | |
| *B01D 46/00* | (2006.01) | |

(52) U.S. Cl.
CPC ......... *G07C 5/006* (2013.01); *B01D 46/0002* (2013.01); *F02M 35/0208* (2013.01); *F02M 35/10373* (2013.01); *G06F 3/048* (2013.01)

(58) Field of Classification Search
CPC . G07C 5/006; B01D 46/0002; F02M 35/0208
See application file for complete search history.

(56) References Cited

U.S. PATENT DOCUMENTS

| | | |
|---|---|---|
| 5,036,698 A | 8/1991 | Conti |
| 7,261,762 B2 | 8/2007 | Kang et al. |
| 8,701,473 B2 | 4/2014 | Uehara |
| 2004/0217872 A1 | 11/2004 | Bhardwaj et al. |
| 2018/0154297 A1* | 6/2018 | Maletich .................. F24F 11/39 |
| 2018/0163589 A1* | 6/2018 | David ................. F01N 13/0093 |
| 2018/0200657 A1* | 7/2018 | Soldi .................. B01D 46/0086 |

FOREIGN PATENT DOCUMENTS

WO    WO 2016087302 A1    6/2016

* cited by examiner

*Primary Examiner* — Adam M Alharbi
(74) *Attorney, Agent, or Firm* — Miller, Matthias & Hull

(57) ABSTRACT

A method for estimating a remaining useful life of an air filter. The method includes determining, at a controller of a machine, a delta pressure of the air filter in the machine based on an input from a plurality of sensors. The method includes determining a percent plugged of the filter based upon a non-linear relationship between the delta pressure and the percent plugged of the air filter. The method includes estimating the remaining useful life of the filter based upon the percent plugged.

20 Claims, 5 Drawing Sheets

SYSTEM AND METHOD OF DETERMINING REMAINING USEFUL LIFE OF AN AIR FILTER

TECHNICAL FIELD

This patent disclosure relates generally to air filters, and more particularly, to a system and method for determining the health and remaining useful life of an air filter.

BACKGROUND

In a combustion engine, air from the surrounding atmosphere is introduced to the engine to mix with fuel in the combustion chamber. Dirty and/or contaminated intake air may not only affect the engine performance, but also damage moving parts of the engine, resulting in increased maintenance costs and reduced life of the engine. To ensure the cleanliness of the intake air, an air filter is used to filter out dirt, debris, and other contaminants from the intake air.

Off-highway machines, such as, for example, tractors, wheel loaders, backhoe loaders, bulldozers, and excavators, may operate in and be exposed to harsh working environments with high concentrations of dust and debris. The air filters used in these machines offer high strength to withstand the vibrations expected in the machines and high dirt-holding capacity to adequately protect the engine for the desired service life of the filter elements. Accordingly, these machines are equipped with a relatively large air filter. An air filter may include an air filter element and a filter housing for housing and protecting the air filter element.

Typically, machine air filters are replaced based on a predetermined number of set hours of use and/or a worst-case scenario. The determination of such set hours of use is based on generic filter types and is not specific to the type of filter being considered for replacement. However, different filters have different rates at which they get loaded with particles, and applying a generic conventional scheme to replace the filter based on the hours of use may result foregoing opportunities in operating cost. Further, even for the same filter type, each individual filter has a different loading rate depending upon usage and other environmental factors. Therefore, replacing a filter based upon an hours of usage may not fully utilize the actual operable life of the filter.

Some conventional systems use an electronic control module (ECM) to calculate the pressure differential (P) across a filter, and then use an algorithm to calculate the condition of the filter from the pressure differential. See, for example, U.S. Patent Application Publication No. 2004/0217872. However, such algorithms may not be accurate.

Accordingly, there is a need to resolve these and other problems related to the conventional filter health and remaining useful life prediction techniques.

SUMMARY

In one aspect, a method for estimating a remaining useful life of an air filter is provided. The method includes determining, at a controller, a measured delta pressure ($\Delta P_{meas}$) of the air filter based on an input from one or more sensors; determining a new air filter delta pressure ($\Delta P_0$) of the air filter in the machine at a given set of machine operating parameters; generating a new air filter delta pressure ($\Delta P_0$) model for the air filter 108 in the machine, based upon the new air filter delta pressure ($\Delta P_0$) across a range of a single variable (such as mass air flow) and at the given set of machine operating parameters; calculating a normalized delta P ($\Delta P_{norm}$) based upon the new air filter delta pressure ($\Delta P_0$), the measured delta pressure ($\Delta P_{meas}$), a plugged filter delta pressure ($\Delta P_{100}$), and a maximum new air filter delta pressure (max $\Delta P_0$); calculating a percent plugged ($\theta$) of the air filter based upon the normalized delta P ($\Delta P_{norm}$) to generate a linearized percent plugged model; calculating a total filter usage hours (t); determining a contamination rate ($\theta'$) of the filter based on the total filter usage hours (t) and the percent plugged ($\theta$); generating a remaining useful life (RUL) of the air filter based on the contamination rate ($\theta'$); and transmitting the remaining useful life (RUL) of the air filter to a display.

In another aspect, a system for estimating a remaining useful life of a filter is provided. The system includes an electronic control module operatively coupled to a plurality of sensors and configured to determine a measured delta pressure ($\Delta P_{meas}$) of the air filter in the machine based on an input from one or more sensors; determine a new air filter delta pressure ($\Delta P_0$) of the air filter in the machine at a given set of machine operating parameters; generate a new air filter delta pressure ($\Delta P_0$) model for the air filter based upon the new air filter delta pressure ($\Delta P_0$) across a range of a single variable (such as mass air flow) and at the given set of machine operating parameters; calculate a normalized delta P ($\Delta P_{norm}$) based upon the new air filter delta pressure ($\Delta P_0$), the measured delta pressure ($\Delta P_{meas}$), a plugged filter delta pressure, ($\Delta P_{100}$), and a maximum new air filter delta pressure (max $\Delta P_0$); calculate a percent plugged ($\theta$) of the air filter 108 based upon the normalized delta P ($\Delta P_{norm}$) to generate a linearized percent plugged model; calculate a total filter usage hours (t); determine a contamination rate ($\theta'$) of the filter based on the total filter usage hours (t) and the percent plugged ($\theta$); generate a remaining useful life (RUL) of the air filter based on the contamination rate ($\theta'$); and transmit the remaining useful life (RUL) of the air filter to a display.

In another aspect a machine comprising a system for estimating a remaining useful life of an air filter is provided.

DETAILED DESCRIPTION

Figure 1:
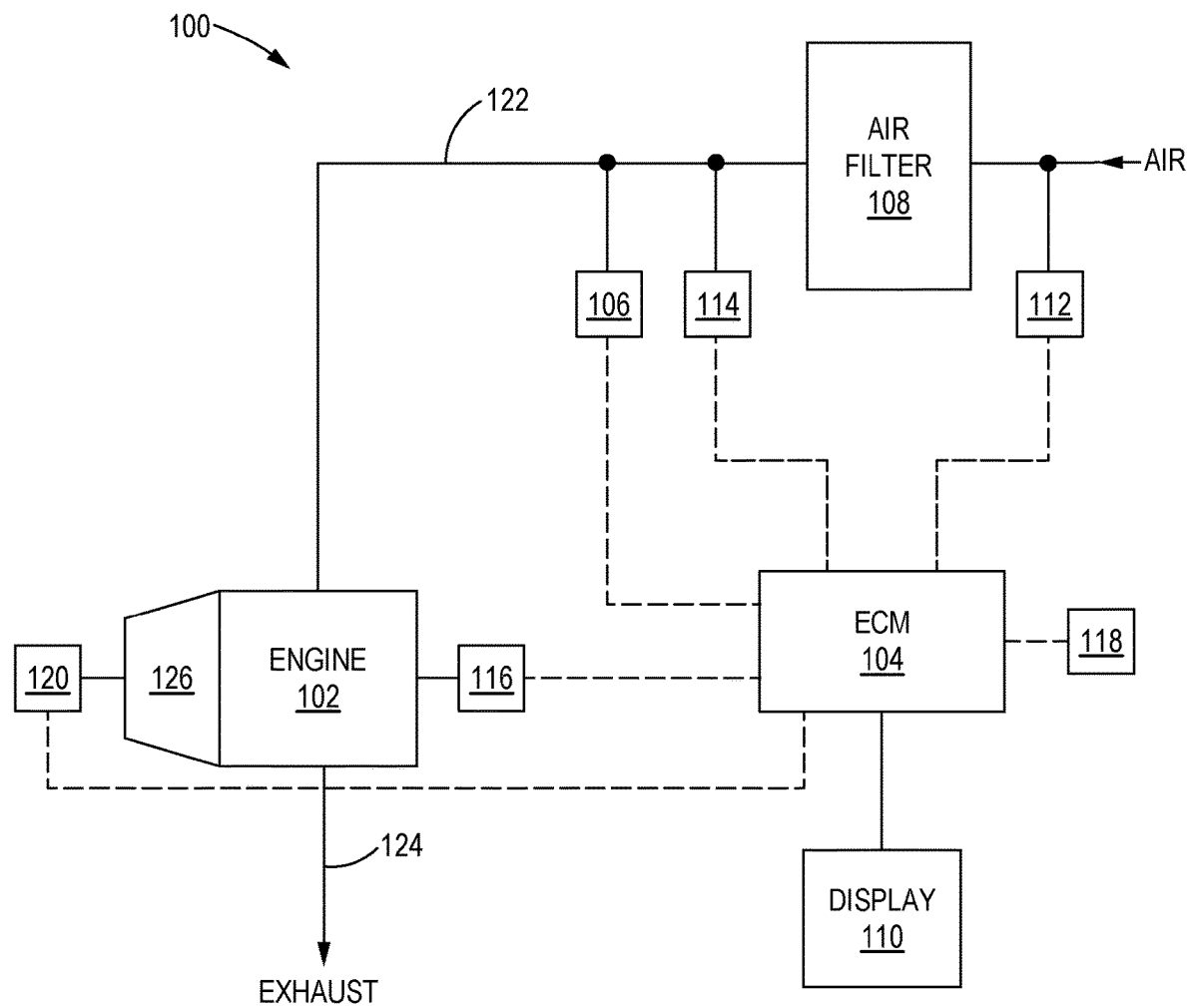
FIG. 1 illustrates a machine including a system for estimating the remaining useful life of an air filter, in accordance with an aspect of this disclosure.

FIG. 1 illustrates a machine 100 including a system for estimating the remaining useful life of an air filter, in accordance with an aspect of this disclosure. It will be appreciated that the specific positioning and arrangement of various components of the machine 100 in FIG. 1 is by way of example only and not by way of limitation, as other positions and arrangements may exist.

The machine 100 may be a mobile or a stationary machine that performs operations associated with industries such as mining, construction, farming, transportation, landscaping, oil industry, manufacturing, or the like. For example, the machine 100 may be a track type tractor or dozer, a motor grader, a drilling station, a car, a truck, a bus, or other types of stationary or mobile machines. The machine 100 may be operating on a worksite and may be in communication with a base station and a global navigation satellite system (GNSS) for operation.

The machine 100 includes an engine 102, a controller or electronic control module (ECM) 104, a fuel tank (not shown), an air flow sensor 106, an air filter 108, a display 110, an air intake pressure sensor 112, an air outlet pressure sensor 114, an engine speed sensor 116, an ambient air temperature sensor 118, a machine speed sensor 120, an air intake line 122, an exhaust line 124 and an engine transmission 126.

The engine 102 may be a large gas engine, a diesel engine, a dual fuel engine (natural gas-liquid fuel mixture), an electric/battery powered motor, a hybrid electric-natural gas-fossil fuel engine, combinations thereof or any other type of large engine. The engine 102 may be of an in-line type, a V-type, a rotary type, or other types known in the art. The engine 102 may also include one or more fuel injectors or admission valves or a combination thereof for providing fuel to the cylinders that may be used for combustion in the engine. An intake manifold and an exhaust manifold are each fluidly coupled with the cylinders. The intake manifold receives air from the air intake line 122 via an optional turbocharger or supercharger (not shown). The exhaust manifold carries exhaust gases from the engine 102 through the exhaust line 124.

In a combustion engine such as that depicted here, air from the surrounding atmosphere is introduced to the engine 102 via the intake line 122 to mix with fuel in the combustion chamber. Dirty and/or contaminated intake air may not only affect the engine performance, but also damage moving parts of the engine, resulting in increased maintenance costs and reduced life of the engine. To ensure the cleanliness of the intake air, an air filter 108 in fluid communication with the air intake line 122 is used to filter out dirt, debris, and other contaminants from the intake air.

The machine 100 may include other components, including but not limited to, vehicular parts including tires, wheels, engagement mechanisms, transmission, steering system, additional sensor modules, additional motors, on-board communication systems, catalytic converters, axles, crankshafts, camshafts, gear systems, clutch systems, batteries, throttles, actuators, suspension systems, cooling systems, exhaust systems, chassis, ground engaging tools, imaging systems, power trains, and the like (not shown). It will be appreciated that lines connecting various components of the machine 100 are not limiting in terms of the connections, positioning, and arrangements of the components of the machine are concerned. Rather, these lines in FIG. 1 are for illustrative purposes and other lines or other arrangements, positions, and couplings of the components of the machine 100 may exist.

The air intake pressure sensor 112 is coupled to the air intake side of the air filter 108. The air outlet pressure sensor 114 is coupled to the air outlet side of the air filter 108. The intake pressure sensor 112 and the outlet pressure sensor 114 are coupled to the ECM 104 to communicate any pressure drop (measured delta pressure) across the air filter 108, typically in kilopascals, or kPas. By way of example only, the pressure sensors 112, 114 may be a dual absolute pressure sensor.

The engine speed sensor 116 is coupled to the engine 102 and measures engine speed, typically in rotations per minute, or RPMs. The engine speed sensor 116 may be a tachometer configured to measure an instantaneous speed of the engine 102, although other types of speed sensors could be used. The speed sensor 116 is coupled to the ECM 104 to communicate speed information.

The ambient air temperature sensor 118 may be a thermometer device coupled to the ECM 104 to communicate temperature information (e.g., in ° C./° F.) to the ECM 104.

The machine speed sensor 120 is typically linked to the engine transmission 126 and measures the speed of the machine 100. The machine speed sensor 120 is coupled to the ECM 104 to transmit machine speed information.

It will be appreciated that the positions of the various sensors, such as intake pressure sensor 112, the outlet pressure sensor 114, the engine speed sensor 116, the ambient temperature sensor 118 and the machine speed sensor 120 are shown by way of example only and not by way of limitation as other positions may exist. Also, the intake pressure sensor 112, the outlet pressure sensor 114, the engine speed sensor 116, the ambient temperature sensor 118 and the machine speed sensor 120 are not the only sensors inside the machine 100. Other sensors or sensor modules may be present to detect various parameters associated with the machine 100. In addition to or optionally, the sensors may communicate various measurements of the machine 100 as electrical or wireless signals to a remote base station (not shown) for analysis and control.

The ECM 104 is a programmable electronic device that is coupled to the air inlet pressure sensor 112, the air outlet pressure sensor 114, the engine speed sensor 116, the ambient air temperature sensor 118 and the machine speed sensor 120, in addition to other filters, sensor modules, fuel systems, and actuator systems of the machine 100. The ECM may be configured like the one described in co-owned U.S. Patent Publication No. 2016/0116392, incorporated herein by reference. Data is obtained from the intake pressure sensor 112, the outlet pressure sensor 114, the engine speed sensor 116, the ambient temperature sensor 118, the machine speed sensor 120 and/or other sensor modules and actuator systems of the machine 100 is transmitted to the ECM 104. The ECM 104 uses the data to determine the health and/or remaining useful life of the air filter 108 as explained more fully below.

The display 110 is controlled by the ECM 104 and may be configured, for example, to display a continuous estimate of the health and the remaining useful life of the air filter 108. Based on the displayed data on the display 110, a technician may plan the logistics associated with the upkeep and replacement of the air filter 108. The display 110 may generally be an output device configured to output real-time data related to the health and the remaining useful life of the filter 108 as and when electrical signals form the plurality of sensors are received and processed by the ECM 104. For example, the display 110 may be a display unit inside an operator cab of the machine 100. Alternatively, the display 110 may be an output device provided at other locations on the machine 100. In one aspect, the display 110 may be in a remote location away from the machine 100. The display 110 may then display data wirelessly communicated from the ECM 104 via one or more antennas (not shown) on the machine 100 to a remote base station (not shown). Such a scenario may exist, for example, in hazardous environments where the machine 100 may be operated remotely in an unmanned mode.

The display 110 may be a liquid crystal display, although other types of display may be used. The display 110 may be a light emitting diode (LED) based indicator configured to indicate a health and remaining useful life of the filter 108, among other parameters. The display 110 may, for example, communicate with the ECM 104 and/or a graphics ECM inside the ECM 104 to provide a display, in real-time, regarding various variables associated with the machine 100 while the machine 100 is being used, in addition to the parameters of the filter 108. The display 110 may provide visual indications of real time or instantaneous speed and temperature of the engine 102, pressure drop or delta pressure across the filter 108, a health estimate of the filter 108, and a remaining useful life (RUL) of the filter 108, during usage of the machine 100.

INDUSTRIAL APPLICABILITY

Conventionally, filters in various machines are replaced based on an arbitrarily set hours of use. The determination of such set hours of use is based on generic filter types and is not specific to the type of filter being considered for replacement. In reality, different filters have different contamination rates and applying a generic conventional scheme to replace a particular type of filter based on prefixed hours of use may result in wasteful use, increasing overhead and operational costs. Further, even for the same filter type, each individual filter has a different contamination rate depending upon usage and other environmental factors. Simply replacing a filter based upon an hours of usage metric may not fully utilize the actual operable life of the filter.

According to this disclosure, an exemplary solution to the problems in conventional systems and methods is to provide a better technique based on a more accurate model of the contamination of the filter 108 and using the data obtained from one or more of the plurality of sensors (e.g., the pressure sensors 112, 114) in the model to better predict and improve an estimate of the remaining useful life of the filter 108 in real-time as the filter 108 is being used by the machine 100 during operation of the machine 100.

Figure 2:
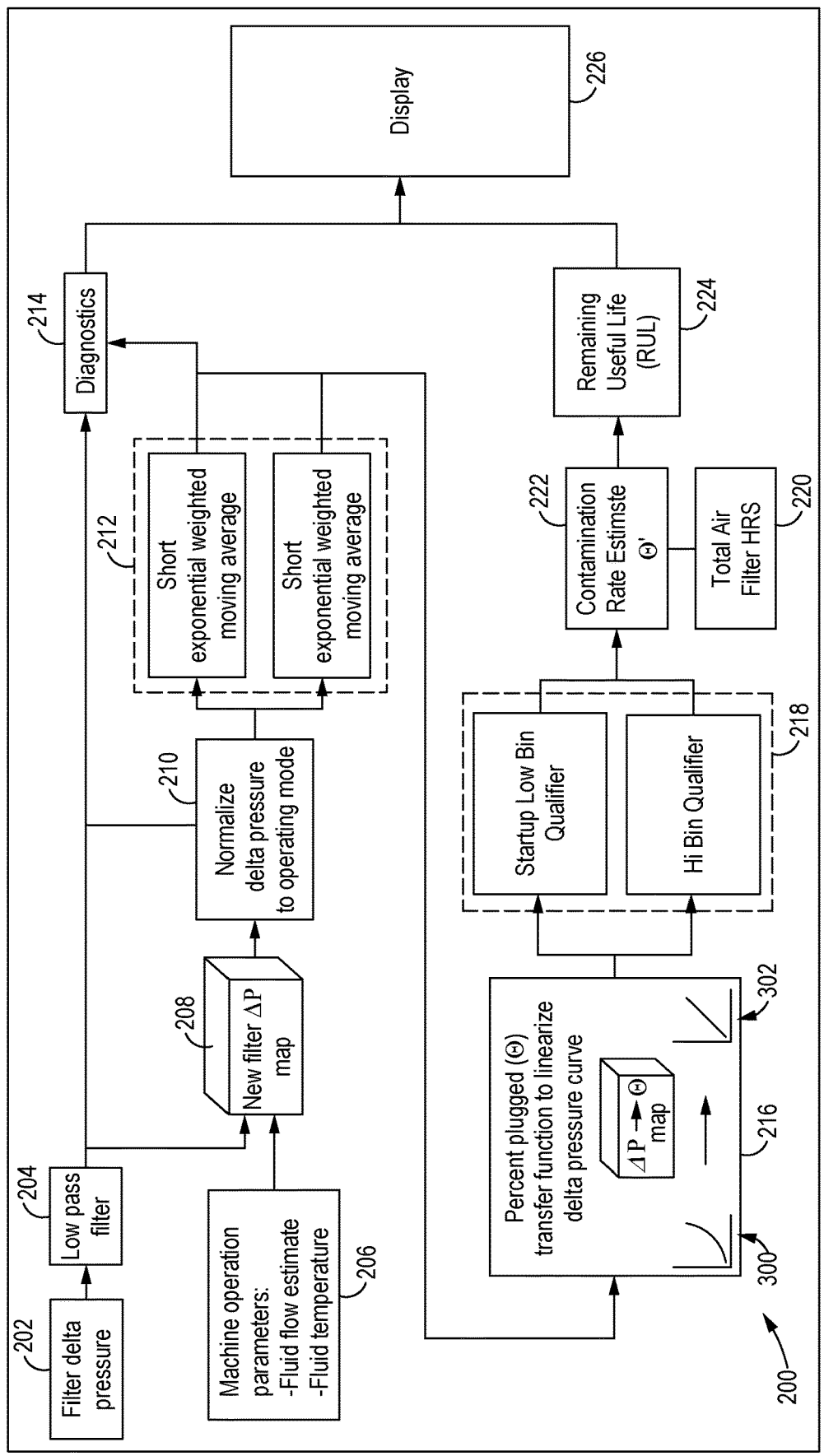
FIG. 2 illustrates a method for estimating the remaining useful life of an air filter using a flow diagram, in accordance with an aspect of this disclosure.

FIG. 2 illustrates a method 200 for estimating the percent plugged and remaining useful life of an air filter 108 using a flow diagram, in accordance with an aspect of this disclosure. One or more operations in the method 200 may be carried out by the ECM 104 inside the machine 100. For example, the one or more processes or operations may be carried out inside the ECM 104 using the data received from the plurality of sensors and a plurality of filter models, and executing computer executable instructions stored in the ECM 104. As discussed above, the data from the plurality of sensors may be received at the ECM 104 and processed while the machine 100 is in use or is in operation in a work environment. One or more processes or operations, or sub-processes thereof, may be skipped or combined as a single process or operation, and the flow of processes or operations in the method 200 may be in any order not limited by the specific order illustrated in FIG. 2.

The method comprises the following steps or operations:

In an operation 202, the method comprises determining, at the ECM 104, a measured delta pressure ($\Delta P_{meas}$) of the air filter 108 based on an input from two different pressure sensors, such as an air intake pressure sensor 112 and an air outlet pressure sensor 114, or may be taken directly with a single differential pressure sensor. The pressure differential across the air filter 108 may be continually measured, typically ten times per second, and received at the ECM 104. The pressure differential (and other variables) may be obtained as a continuous time series as the machine 100 is in operation or use, and instantaneous values may be stored in the ECM 104 based upon a sampling rate at which the sensors are probed by the ECM 104 to obtain the data. Thus, in an operation 202, the ECM 104 may obtain a first pressure ($P_1$) before the filter 108 (or, at an input of the filter 108) from the pressure sensor 112 and a second pressure ($P_2$) after the filter 108 (or, at an output of the filter 108) from the pressure sensor 114 to obtain the measured delta pressure ($\Delta P_{meas}$).

In an operation 204, the measured delta pressure ($\Delta P_{meas}$) may be low pass filtered to remove noise and other undesired signal artifacts, e.g., sensor drift of the plurality of pressure sensors 112, 114 and/or other sensors providing signals to the ECM 104. For example, the ECM 104 may send the measured delta pressure ($\Delta P_{meas}$) data as a signal to a low pass filter 204 to meas, smooth out the measured delta pressure ($\Delta P_{meas}$) data received during or after the usage of the air filter 108. Alternatively, the operation 214 may be carried out prior to the ECM 104 processing the data or signal received from the pressure sensors 112, 114 and/or other sensors in the machine 100.

In operation 206 various machine parameters, such as mass air flow and ambient air temperature, are transmitted to the ECM 104. The mass air flow may be obtained by an air flow sensor 106 and the ambient air temperature may be obtained by an ambient air temperature sensor 118. The mass air flow and the ambient air temperature may be obtained as a continuous time series as the machine 100 is in operation or use, and instantaneous values may be stored in the ECM 104 based upon a sampling rate at which the air flow sensor 106 and the air temperature sensor 118 are probed by the ECM 104 to obtain the data.

In operation 208, the ECM 104 obtains a new air filter delta pressure ($\Delta P_0$) of the air filter 108 in the machine 100 at a given set of machine operating parameters [such as engine speed, machine speed and air temperature] and across one or more variables, such as mass flow rate of air, and then generates a new air filter delta pressure model 300 (shown in FIG. 3) for a specific type of air filter from a plurality of filter models for when the air filter 108 is/was new (or, 0% plugged).

The new air filter delta pressure model 300 may be stored as a look-up table in the memory of the ECM 104. The new air filter delta pressure model 300 provides the ECM 104 data regarding a pressure drop or delta pressure (e.g., in kPa) across the air filter when new with respect to the engine speed (e.g., in rpm) and other variables. By way of example only and not by way of limitation, the new air filter delta pressure model 300 may provide delta pressure in a range of zero to 2 for mass flow rates from 0 to 1000 $ft^3$ as illustrated in FIG. 3.

The plurality of filter models may be arranged to be displayed on the display 110, for example, upon commands received from the ECM 104. The ECM 104 may store the plurality of filter models as a lookup table (LUT). Such data may be used to generate and store one or more models simulating the contamination profile of the air filter 108. Further, different types of the plurality of filter models may exist in the memory of the ECM 104 for different types of air filters (e.g., based on vendor type, functionality, size, etc.).

Using the new air filter delta pressure model 300, the ECM 104 determines what the delta pressure across the filter 108 should be at a given set of machine operating condition(s), such as mass flow of air, machine loading, ambient air temperature, etc., if the filter 108 were completely unplugged. The result is a non-linear model such as that shown in FIG. 3.

Figure 3:
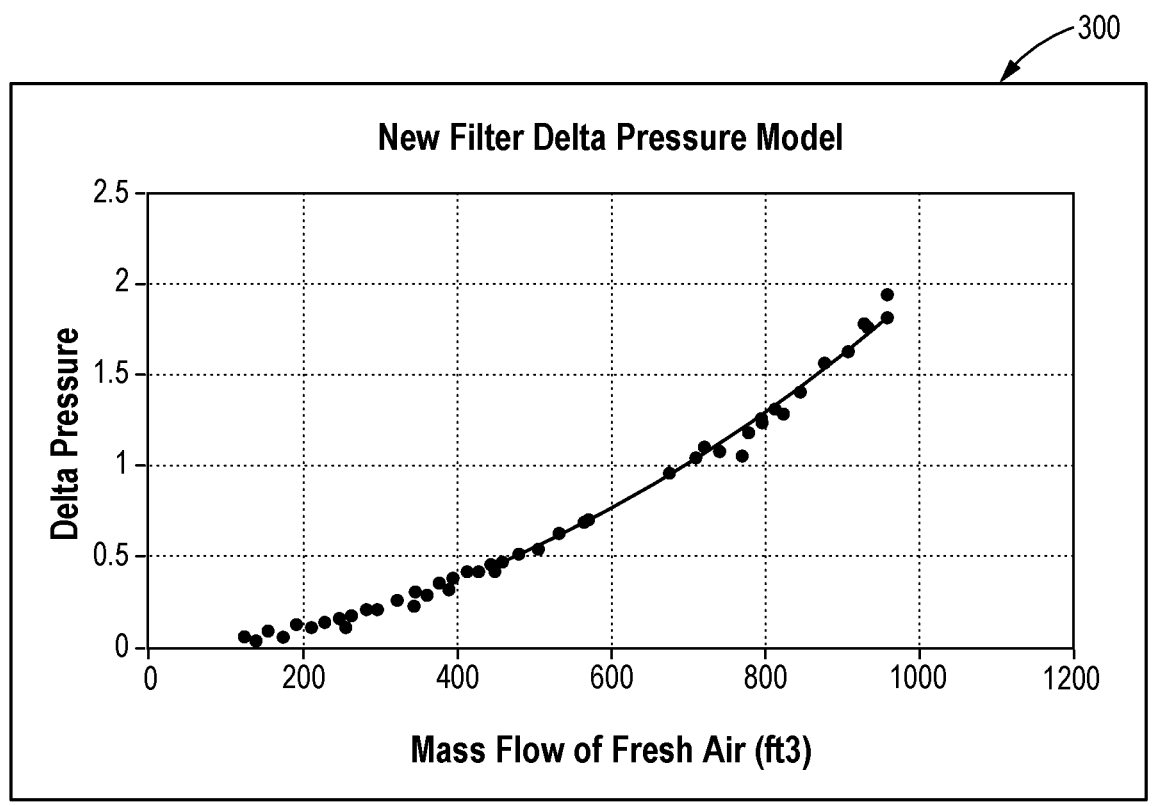
FIG. 3 illustrates a plot for a non-linear estimate of a delta pressure across a new air filter, in accordance with an aspect of this disclosure.

FIG. 3 illustrates a model 300 for a non-linear estimate of a delta pressure across a new air filter. The new air filter delta pressure model 300 may be stored as a look-up table in the ECM 104. The new air filter delta pressure model 300 provides the ECM 104 data regarding a pressure drop or delta pressure (e.g., in kPa) with respect to the mass flow of air across the air filter 108.

Still in operation 208 the ECM 104 also determines a maximum new air filter delta pressure (max $\Delta P_0$) during normal operating conditions, from the new air filter delta pressure model 300 shown in FIG. 3.

The delta pressure when the air filter 108 is new or 0% plugged ($\Delta P_0$), and the max ($\Delta P_0$) are dependent on a number of factors, including engine speed, estimated mass of air flow through the filter 108, the requested fresh air for the machine 100, ambient temperature and machine load factors. One or more factors may be considered at a time. For example, as shown in FIG. 3, $\Delta P_0$ and max ($\Delta P_0$) may be obtained from the plot of the new air filter 108 delta pressure over a range of mass air flow conditions.

In operation 210, the method comprises calculating, at the ECM 104, a normalized delta P ($\Delta P_{norm}$) based upon the measured delta pressure ($\Delta P_{meas}$) obtained in operation 202, the new air filter delta pressure ($\Delta P_0$) obtained in operation 208, a plugged filter delta pressure ($\Delta P_{100}$) (a constant), and the maximum new air filter delta pressure (max $\Delta P_0$) also obtained from operation 208. The normalized delta P may be calculated using the following equation (1):

$$\Delta P_{norm} = (\Delta P_{meas} - \Delta P_0)/(\Delta P_{100} - (\max(\Delta P_0))) \quad (1)$$

where:
$\Delta P_{meas}$ is the measured delta pressure across the air filter 108, in kPa, and thus a measure of delta pressure;
$\Delta P_0$ is the delta pressure when the air filter 108 is new or 0% plugged obtained from a table or from a model such as the one shown in FIG. 3;
$\Delta P_{100}$ is the delta pressure when the filter 108 is fully plugged or 100% plugged (obtained from a table or model, typically between 6.2 and 7.5 kPa); and
max ($\Delta P_0$) is maximum new air filter delta pressure during normal operating conditions, a constant obtained from a table or model, (about 1.9-2.0 kPa in FIG. 3)

Optionally, in an operation 212, the ECM 104 applies a short term exponential weighted moving average ($\Delta P_{ewma}$) and/or a long term exponential weighted moving average ($\Delta P_{ewma}$) to the normalized delta P ($\Delta P_{norm}$) value calculated in operation 210 (Step 3). The moving average may be determined by the ECM 104 by exponentially weighing the past and current data associated with the filter 108. The averages are compared and the delta is utilized for a diagnostic (in operation 214). For example, the short term exponential weighted moving average ($\Delta P_{ewma}$) can be used to detect abrupt changes to air filter performance. The long term exponential weighted moving average ($\Delta P_{ewma}$) can be used in calculating the remaining useful life (RUL) of the air filter 108.

In operation 216, the method comprises calculating, at the ECM 104, a plugging parameter, such as percent plugged ($\theta$) of the air filter 108 based upon the normalized delta P ($\Delta P_{norm}$) obtained in operation 210 to generate a linearized percent plugged model. The percent plugged ($\theta$) is a measure of the health of the air filter 108 and is partly based on the contamination profile obtained by the new air filter delta pressure model 300 at a given temperature and flow (or engine speed) obtained from laboratory testing of the filter 108 (or, an equivalent or similar type of filter). Thus, operation 216 may include determining, at the ECM 104, a health estimate of the air filter 108 based upon the percent plugged ($\theta$), the health estimate being determined as one of a plurality of threshold ranges of the percent plugged ($\theta$).

Conventionally, filters in various machines are replaced based on an arbitrarily set hours of use. The determination of such set hours of use is based on generic filter types and is not specific to the type of filter being considered for replacement. In reality, different filters have different contamination rates and applying a generic conventional scheme to replace a particular type of filter based on prefixed hours of use may result in wasteful use, increasing overhead and operational costs. Further, even for the same filter type, each individual filter has a different contamination rate depending upon usage and other environmental factors. Simply replacing a filter based upon an hours of usage metric may not fully utilize the actual operable life of the filter.

According to this disclosure, an exemplary solution to the problems in conventional systems and methods is to provide a better technique based on a more accurate model of the contamination of the filter 108 and using the data obtained from one or more of the plurality of sensors (e.g., the pressure sensors 112, 114) in the model to better predict and improve an estimate of the remaining useful life of the filter 108 in real-time as the filter 108 is being used by the machine 100 during operation of the machine 100. Based upon the contamination or loading profile, a non-linear relationship between the percent plugged ($\theta$) and the hours in use may be established. For example, an exponential function according to equation (2) below may be used to fit to the test data of the filter 108 and the percent plugged ($\theta$) may be determined based upon such a non-linear relationship according to equation (2):

$$\theta = f[\log(\Delta P_{norm})] \quad (2)$$

The ECM 104 takes into account the non-linear relationship between the percent plugged ($\theta$) and the delta pressure $\Delta P$, in addition to or as an alternative to the non-linearities in speed and temperature measurements, to more accurately get the health and the remaining useful life (RUL) estimate. The percent plugged ($\theta$) is determined in real time and can be obtained from a look up table or the logarithmic equation (2). The method may comprise in operation 216 converting the percent plugged ($\theta$) into an estimated remaining useful life (RUL) of the air filter 108 in terms of operating hours of useful life.

Figure 4:
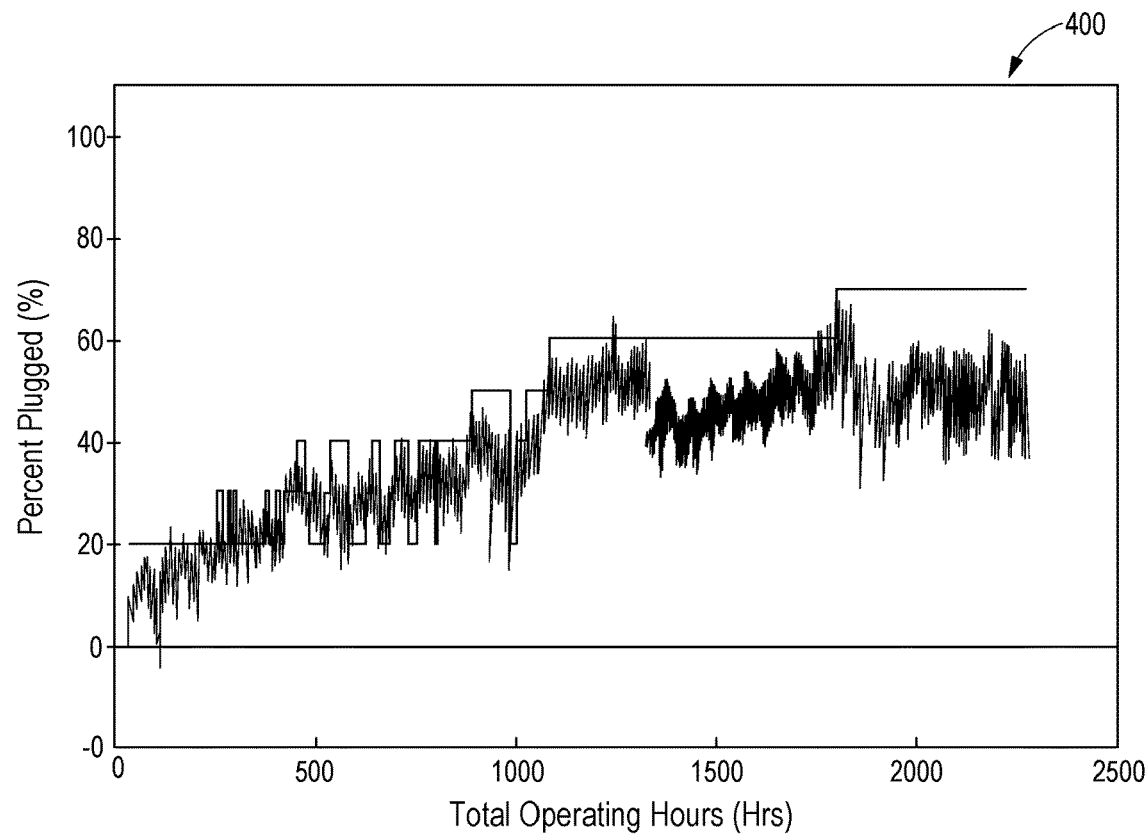
FIG. 4 illustrates a plot for a percent plugged across an air filter for a first machine at a first set of conditions.

FIG. 4 illustrates a plot or graph 400 of percent plugged ($\theta$) across the air filter 108 versus machine operating hours for an exemplary machine 100 at a first set of conditions. The blue points on the graph 400 are the calculated values for percent plugged using equation 2. After 2000 hours the percent plugged in about 70%, so it is apparent that in this example the machine 100 operated for over 2000 hours without fully plugging up.

As can be readily seen in FIG. 4, the percent plugged data is quite noisy and does not readily lend itself to easy interpretation. It is useful to perform some noise reduction on the data. One approach is to aggregate the data into "bins", for example, into percent plugged ranges of every 10 percentage points.

Thus, the method comprises, in operation 218, generating, at the ECM 104, a start-up low Bin qualifier and a hi bin qualifier based upon the percent plugged data. A start up low bin qualifier checks whether a new filter has been installed on the machine 100. A start up low bin qualifier checks whether a new filter has been installed on the machine 100. Instead of indicating a percent plugged at, say 15.6%, running the percent plugged through a Bin qualifier enables the system to indicate that the percent plugged is within the range of, for example, 10-20%.

Referring again to FIG. 4 the smoothed out (bin qualified) percent plugged (bin θ) values are shown in red. rather than going up and down as with the raw data, the bin qualified percent plugged always goes up. When the machine 100 first operates, even the smoothed out percent plugged jumps around. After operating more than 1000 hours the percent plugged steps up less frequently.

Figure 5:
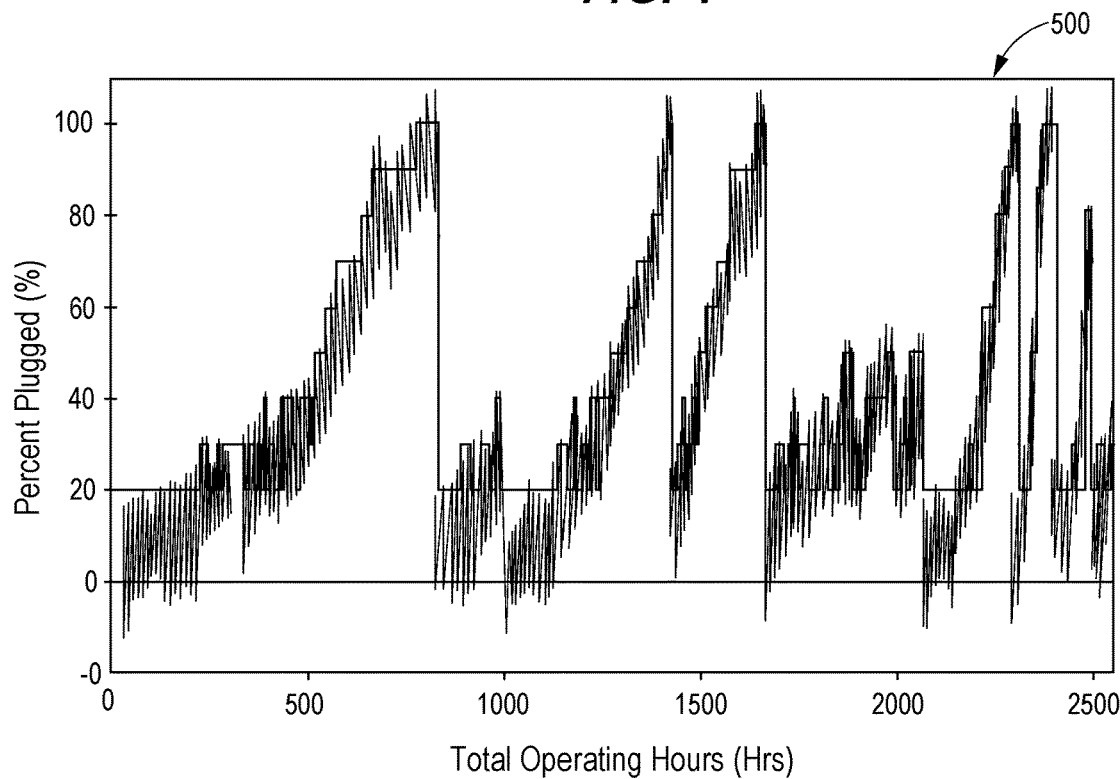
FIG. 5 illustrates a plot for a percent plugged across an air filter across an air filter for a second machine at a second set of conditions.

FIG. 5 illustrates a plot or graph 500 for a percent plugged across an air filter 108 for a second machine 100 at a second set of conditions. The air filter 108 plugs quite often and is changed frequently, about every 250 hours. A possible explanation is that in its early operating days the machine 100 is operating in winter conditions and the air filter 108 is subject to relatively less air particulates, while in its later lifetime the machine 100 and air filter 108 are subject to more dusty conditions, as might be expected in summer.

In an operation 220, a total filter usage hours (t) of the filter 108 is obtained by the ECM 104. The total filter hours may be based upon a difference of a time between a total time the machine 100 has been operating and a time when the filter 108 was newly installed or was changed. The total filter hours may be changed or reset by a technician every time the filter 108 is changed or cleaned.

In an operation 222, the ECM 104 determines or estimates a contamination rate (θ') of the filter 108. The contamination rate (θ') may be obtained by the following basic equation:

$$\theta' = \Delta\theta / t$$

where:
t is the number of hours the air filter 108 has been in use; and
Δθ is the change in percent plugged over that same time.
For example, if t=1000 hrs and θ (calculated from operation 216) is 80%, then $$\theta' = (80\% - 0\%)/1000 \text{ hrs} = 0.08\%/\text{hr}.$$

Alternatively, the contamination rate (θ') may be obtained by the ECM 104 using a recursive least squares (RLS) algorithm or other type of estimation algorithm as disclosed in more detail in U.S. Patent Application Publication No. 2016/0116392 incorporated herein by reference.

Referring back to FIG. 2, in an operation 224, the ECM 104 may determine the remaining useful life (RUL) of the filter 108 using an equation (3):

$$RUL = (EOL/\theta') - (T-t) \quad (3)$$

where:
EOL is an acronym for an end of life parameter, e.g., set to 100, for a fully plugged air filter,
(θ') is the contamination rate of the air filter (in %/Hr) from operation 222,
T is the total operating hours of the machine 100 (in Hrs),
t is a time since the air filter 108 was last changed (in Hrs), and
RUL is the remaining useful life (in Hrs.).

For example, when the plugging parameter θ is expressed as a percent plugged value to estimate the contamination rate and the remaining useful life, the percent plugged is within a range of 0% to 100%, with 100% representing a fully plugged state of the filter 108. The contamination rate estimate θ' is measured in percentage (%) per hour, in which the air filter 108 is being plugged. By dividing percentage (EOL) by percentage per hour (%/Hr.), equation (3) yields a total number of hours (or, RUL) that the air filter 108 could survive if plugging is continued at the current rate. For example, if EOL=100% and θ'=0.08%/Hr., then:

$$RUL = 100/0.08 = 1250 \text{ Hours}.$$

In operation 226 the ECM 104 transmits the RUL and/or Bin qualified percent plugged data of the air filter 108 to a display 110 while the machine 100 is in use. Various means can be used for his purpose, including a gage that lights up or changes color or shows a percent value.

Figure 6:
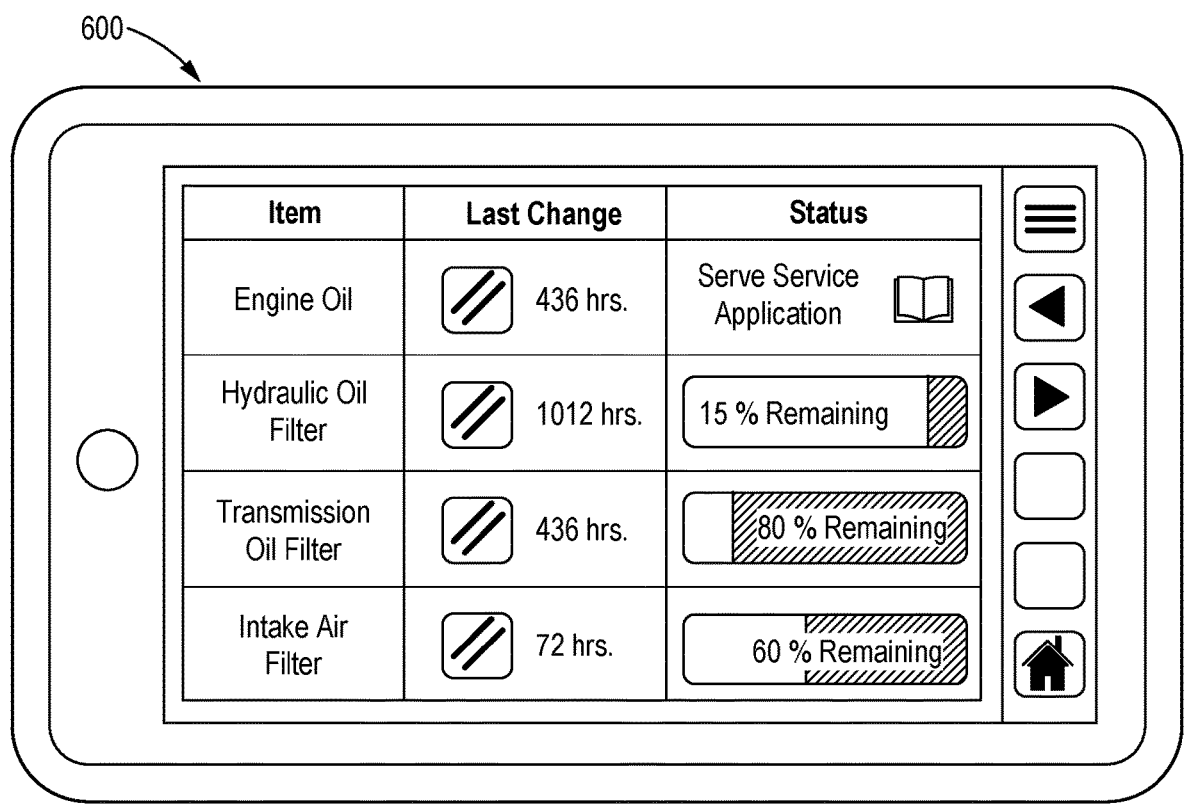
FIG. 6 illustrates a plot for a remaining useful life estimate of the filter, in accordance with an aspect of this disclosure.

For example, FIG. 6 shows an exemplary display 600 that indicates that the air filter 108 has been in use for 234 hours and that its status is "Filter Plugged." This may mean that a threshold percent plugged value has been met or exceeded and that the air filter 108 should be changed before the machine 100 continues being operated.

It will be appreciated that the percent plugged (θ) may be expressed as a percentage and be referred to herein as a percentage plugged value used as an indicator of an amount of plugging of the filter 108, though other parameters could be used to indicate the plugging or contamination of the filter 108. For example, the percent plugged (θ) may be expressed as a normalized value lying between 0 to 1, as an absolute value (e.g., in parts per million or ppm), and the like, or combinations thereof.

A total filter hours of the filter 108 may be obtained by the ECM 104. The total filter hours may be stored in the memory of the ECM 104 based upon a difference of a time between a total time the machine 100 has been operating and a time when the filter 108 was newly installed or was changed. The total filter hours may be changed or reset by a technician every time the filter 108 is changed or cleaned. By way of example only, the ECM 104 may include an internal clock configured to provide a timestamp of a new installation of the filter 108 to the ECM 104.

The ECM 104 may determine or estimate a contamination rate of the filter 108. In one aspect, the contamination rate estimate may be determined by the ECM 104 when a threshold range is crossed. The contamination rate estimate may be displayed on the display 110 as a function of time using a plot showing a contamination rate estimate in FIG. 6.

The RUL estimate may be provided or outputted to the display 110 or to other output devices (not shown). By way of example only and not by way of limitation, the display 110 may be controlled by the ECM 104 to display an RUL estimate curve. Based upon the RUL estimate curve, an operator or a technician can obtain information about when to change or replace the filter 108 with a new filter, based on a real-time condition of the filter 108. Such real-time condition based maintenance of the filter 108 reduces the unnecessary replacement of the filter 108 and saves overhead and operational costs for an owner or user of the machine 100.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The invention claimed is:

1. A method for estimating a remaining useful life of an air filter in a machine, the method comprising the steps of:
   determining, at a controller, a measured delta pressure ($\Delta P_{meas}$) of the air filter in the machine based on an input from one or more sensors;
   determining, at the controller, a new air filter delta pressure ($\Delta P_0$) of the air filter in the machine at a given set of machine operating parameters;
   generating, at the controller, a new air filter delta pressure ($\Delta P_0$) model for the air filter in the machine, based upon the new air filter delta pressure ($\Delta P_0$) across a range of a single variable (such as mass air flow) and at the given set of machine operating parameters;
   calculating, at the controller, a normalized delta P ($\Delta P_{norm}$) based upon the new air filter delta pressure ($\Delta P_0$), the measured delta pressure ($\Delta P_{meas}$), a plugged filter delta pressure ($\Delta P_{100}$), and a maximum new air filter delta pressure (max $\Delta P_0$);
   calculating, at the controller, a percent plugged ($\theta$) of the air filter based upon the normalized delta P ($\Delta P_{norm}$) to generate a linearized percent plugged model 302;
   calculating, at the controller, a total filter usage hours (t);
   determining, at the controller, a contamination rate ($\theta'$) of the filter based on the total filter usage hours (t) and the percent plugged ($\theta$);
   generating, at the controller, a remaining useful life (RUL) of the air filter based on the contamination rate ($\theta'$); and
   transmitting, from the controller, the remaining useful life (RUL) of the air filter to a display 110.

2. The method of claim 1 further comprising:
   receiving, at the controller, a new air filter delta pressure model corresponding to the air filter being new, wherein the measured delta pressure ($\Delta P_{meas}$) of the air filter is based upon the new air filter delta pressure model.

3. The method of claim 2, further comprising:
   generating, at the controller, a Bin qualified percent plugged ($\theta$) based upon the percent plugged ($\theta$);
   transmitting, from the controller, the Bin qualified percent plugged (bin $\theta$) to the display 110.

4. The method of claim 2, wherein the measured delta pressure ($\Delta P_{meas}$) is further based upon a first pressure ($P_1$) before the air filter and a second pressure taken from a pressure sensor and a second pressure ($P_2$) after the air filter.

5. The method of claim 2, wherein the new air filter delta pressure model is associated with a specific type of the air filter.

6. The method of claim 1, wherein the measured delta pressure ($\Delta P_{meas}$) is low pass filtered to remove noise.

7. The method of claim 1, wherein various machine parameters are transmitted to the controller.

8. The method of claim 1, wherein the single variable is mass air flow.

9. The method of claim 1, wherein the new air filter delta pressure model is stored as a look-up table in the controller.

10. The method of claim 1, wherein the normalized delta P is calculated using the following equation:

$$\Delta P_{norm}=(\Delta P_{meas}-\Delta P_0)/(\Delta P_{100}-(\max \Delta P_0))$$

where:
$\Delta P_{100}$ is a delta pressure when the filter is fully plugged.

11. The method of claim 1, wherein the controller applies a short term exponential weighted moving average ($\Delta P_{ewma}$) and/or a long term exponential weighted moving average ($\Delta P_{ewma}$) to the normalized delta P ($\Delta P_{norm}$) value.

12. The method of claim 1 further comprising:
   determining, at the controller, a health estimate of the air filter based upon the percent plugged ($\theta$), the health estimate being determined as one of a plurality of threshold ranges of the percent plugged ($\theta$).

13. The method of claim 1, wherein the method further comprises generating, at the controller, a start-up low Bin qualifier and a hi bin qualifier based upon the percent plugged ($\theta$).

14. The method of claim 1, further comprising the step of resetting the total filter usage hours (t) when the filter is changed or cleaned.

15. The method of claim 1 further comprising:
   displaying, at the display 110 controlled by the controller, a continuous estimate of the remaining useful life (RUL) of the air filter, said displaying being used for identifying when the air filter was installed in the machine and when the air filter is to be replaced with a new air filter.

16. A system for estimating a remaining useful life of an air filter, the system comprising an electronic control module coupled to a display, the electronic control module operatively coupled to a plurality of sensors and configured to:
   determine a measured delta pressure ($\Delta P_{meas}$) of the air filter in the machine based on an input from one or more sensors;
   determine a new air filter delta pressure ($\Delta P_0$) of the air filter in the machine at a given set of machine operating parameters;
   generate a new air filter delta pressure ($\Delta P_0$) model for the air filter in the machine, based upon the new air filter delta pressure ($\Delta P_0$) across a range of a single variable and at the given set of machine operating parameters;
   calculate a normalized delta P ($\Delta P_{norm}$) based upon the new air filter delta pressure ($\Delta P_0$), the measured delta pressure ($\Delta P_{meas}$), a plugged filter delta pressure ($\Delta P_{100}$), and a maximum new air filter delta pressure (max $\Delta P_0$);
   calculate a percent plugged ($\theta$) of the air filter based upon the normalized delta P ($\Delta P_{norm}$) to generate a linearized percent plugged mode;
   calculate a total filter usage hours (t);
   determine a contamination rate ($\theta'$) of the filter based on the total filter usage hours (t) and the percent plugged ($\theta$);
   generate a remaining useful life (RUL) of the air filter based on the contamination rate ($\theta'$) and
   transmit the remaining useful life (RUL) to a display.

17. The system of claim 16, wherein the new air filter delta pressure model is based upon a mass air flow obtained from a mass air flow sensor.

18. The system of claim 17, wherein the new air filter delta pressure model is associated with a specific type of the air filter.

19. The system of claim 15, wherein the electronic control module is configured to estimate the remaining useful life (RUL) of the air filter further based upon a time since the air filter was changed.

20. A machine comprising the system of claim 15.

* * * * *